United States Patent [19]

McCurdy

[11] 4,298,124
[45] Nov. 3, 1981

[54] SLIDE PROGRAMMING DEVICE

[75] Inventor: Frederic McCurdy, Newburgh, N.Y.

[73] Assignee: Graphic Technology, Inc., Newburgh, N.Y.

[21] Appl. No.: 110,036

[22] Filed: Jan. 7, 1980

[51] Int. Cl.³ .............................................. B65D 85/30
[52] U.S. Cl. ................................................... 206/455
[58] Field of Search ............... 206/455, 456, 387, 526, 206/565; 211/72

[56] References Cited

U.S. PATENT DOCUMENTS

| | | | |
|---|---|---|---|
| 2,968,882 | 1/1961 | Ozeki | 206/456 |
| 3,530,593 | 9/1970 | Howard | 206/526 |
| 3,702,132 | 11/1972 | Fites et al. | 206/387 |
| 4,207,979 | 6/1980 | Brown | 206/456 |

Primary Examiner—William T. Dixson, Jr.
Attorney, Agent, or Firm—Sprung, Felfe, Horn, Lynch & Kramer

[57] ABSTRACT

A slide holding device for the editing and sorting of slides includes a planar rigid transparent backing member and a plurality of spaced apart resilient flexible slide holding strips mounted thereon. The strips are spaced apart by a distance not greater than the length of a slide to be held and have a first portion for holding a slide at the bottom edge thereof in either a partially inserted or a fully inserted position and have a second portion for engaging the top edge of the slide when the slide is either in the fully or partially inserted position to maintain the top edge in a spaced apart relationship from the outer surface of the bakcing member.

8 Claims, 5 Drawing Figures

U.S. Patent    Nov. 3, 1981    4,298,124
FIG. 1.
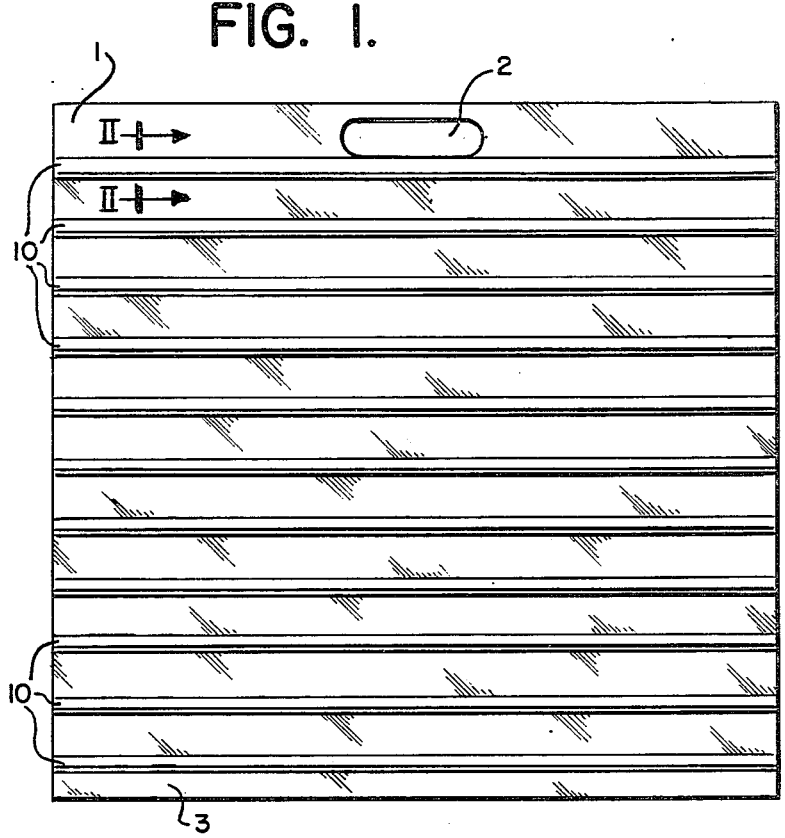
FIG. 2.
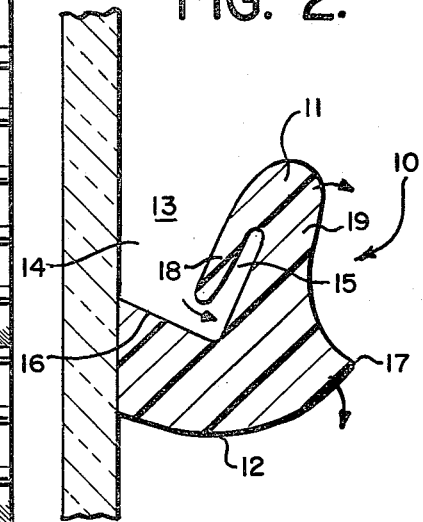
FIG. 3.
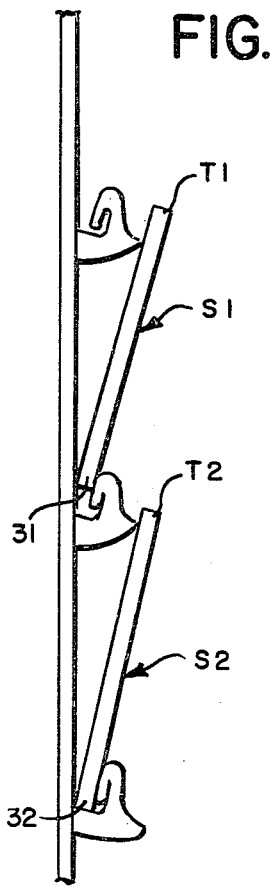
FIG. 4.
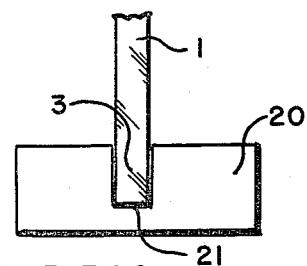
FIG. 5.

SLIDE PROGRAMMING DEVICE

BACKGROUND OF THE INVENTION

The present invention relates to a device for holding slides for the storing, editing and/or programming thereof for later use.

So-called slide programming boards are known in the prior art which include a rigid frame having rigid horizontal row forming members in which a slide is placed during use. These prior art boards have the disadvantage of necessitating an unnecessary amount of time in placing a slide in the unit and present unnecessary amount of difficulty for retrieving slides therefrom. Moreover, because of the rigid design thereof the slides must necessarily be held by their sides when inserted in the board, meaning that fewer slides can be placed in each row thus making the packing density of slides per row inefficient compared to the maximum which could be fit therein. They also suffer from the disadvantage of not laterally fixing the slide when inserted, so that a program of slides is easily inadvertantly destroyed.

SUMMARY OF THE INVENTION

The main object of the present invention is to eliminate the disadvantages of the prior art slide holding devices.

This and other objects of the present invention are obtained according to the slide holding device of the present invention which comprises a transparent planar backing member and means mounted on one face of the planar backing member for holding slides on the backing member in at least one row. The means includes at least two slide holding strips spaced apart by a distance not greater than the length of the slides to be held and each strip comprising resilient flexible material. Each strip has a first portion coactive with the one face of the backing member to form an expandable slot receptive of the bottom edge of a slide therebetween. The slot is configured to be capable of holding a slide in a partially inserted position in response to a first downward force to retain the slide for easy removal and to receive the slide in a fully inserted position in response to a second downward force greater than the first downward force to retain the slide to prevent inadvertent removal or lateral sliding along the row. Each strip also has a second portion for engaging the top edge of the slide when the slide is in either the fully or partially inserted position to maintain the top edge spaced from the one surface of the backing member to facilitate the removal of the slide from the device.

As a result of the structure of the present invention, the holding device according to the present invention can hold 120 two inch square slides with a total board area of 24 inches by 19 inches rather than by the conventional programming board size of 26 inches by 22 inches for the same slide holding capability.

Moreover, as a result of the structure of the slide holding strips and the fact that it is flexible and resilient, the synergistic result is obtained that the slides when mounted in the fully inserted position do not move laterally along the rows nor will they fall out due to an inadvertent movement of the board and yet, this same flexibility and resiliency of the material enables the simple insertion and removal of the slides without an unnecessarily large force.

It is clear that if these slides could slide back and forth along the row, any programming of the slides would be destroyed. Moreover, if the slides were inadvertently knocked off the board, the program would also be destroyed. Thus the retention feature of the flexible resilient slide holding strips is extremely advantageous.

The planar backing member of the device is preferably a clear acrylic plastic while the slide holding strips are preferably a vinyl/rubber, in particular, Kreton TM.

Another advantageous feature of the present invention is the provision of a handle at the top of the board to facilitate the movement of the board from place to place and the provision of a planar extension at the bottom of the board which enables it to be slid into a groove mount for holding same in an upright fashion.

The particular shape of the cross-section of each strip according to the present invention, allows the material to both inwardly and outwardly flex to accept a slide in both the partially inserted and fully inserted positions. The slot formed between the strip and the backing member is expandable and is sufficient to handle the thickness of either cardboard or glass mounted slides. The memory of the material restores the strip to the original shape after the slide is removed and in addition provides a retaining force when the slide is partially or fully inserted. The shape of the strip also enables the upper edge of the slide to lean against it so as to be held away from the board to make the slide easily removable therefrom.

The strips are preferably adhered to the transparent planar backing member and when Kreton TM strips are used with an acrylic plastic board, such as Plexiglass TM, the preferable adhesive is a cyanoacrylic adhesive.

The present invention will not be explained in greater detail with respect to a portrayed embodiment thereof presented by way of example including with respect to the following detailed description and drawings wherein:

BRIEF DESCRIPTION OF THE DRAWINGS

FIG. 1 is a front view of the holding device according to the present invention;

FIG. 2 is a sectional view along line II—II in FIG. 1;

FIG. 3 is a side view of the device of FIG. 1 showing slides fully and partially inserted;

FIG. 4 is a front view of the board of FIG. 1 with slides mounted therein; and

FIG. 5 is a partial side view of an improvement in the device.

DETAILED DESCRIPTION OF THE INVENTION

Referring now to FIG. 1, the slide editing and programming device of the present invention comprises a transparent rigid planar backing member 1 having a handle at the top end thereof by a substantially oval aperture 2 therein.

The member 1 also includes a planar extension 3 at the bottom thereof for use in inserting in a groove mount. Referring to FIG. 5, since the planar backing member 1 is rigid, when portion 3 thereof is inserted in a groove 21 in a mounting member 20, the backing member 1 will be maintained in an upright position for use.

Also mounted on the front face of backing member 1 are a plurality of slide holding strips 10, each of which are identical and are shown in detailed form in FIG. 2.

The strips 10 define rows, which in the case of FIG. 1, amount to ten, for holding slides therealong. It takes two strips 10 to form one row, however, due to the design thereof, two adjoining rows can be formed by three spaced apart parallel strips 10 as shown in FIG. 1 and as will be explained hereinafter in more detail with respect to FIG. 3.

The strips 10 comprise flexible and resilient material which has the normal shape shown in FIG. 2 and which are deformable in response to the insertion of slides 10 along the row as will be explained hereinafter.

Each strip 11 comprises in essence two portions, a first portion 11 which coacts with one surface of the member 1 to hold the bottom edge of a slide and a second portion 12 which coacts with the top portion of the slide to maintain it in a spaced apart position from the front face of the member.

The portion 11 comprises a spring-like portion which has a substantial inverted U-shape having arms 18 and 19 and which defines a slot 13 which is receptive of the bottom edge of a slide and which comprises two slots 14 and 15. The bottom 11 also includes a shoulder 16 which stops the bottom edge of the slide to be held and which in effect defines the fully inserted position of the slide. The portion 12 includes an edge 17 which engages the top portion of the slide when in the fully or partially inserted position as will be defined with respect to FIG. 3.

In FIG. 3, slide S1 is shown in the partially inserted position. In this position, the bottom of edge B1 is not against shoulder 16, however the configuration of portion 11 is such that slot 14 must be expanded to receive the slide S1 (either in the cardboard or glass mounts) and thus there is a deformity of portion 19 in the outward direction, along with the inward deformation of portion 18 which acts to compress slot 15 and a slight downward deformity of portion 12. Due to the resiliency of the material, these deformation act to retain the slide in position. At the same time, the top portion T1 rests against edge 17 to maintain the edge away from planar member 1 to enable the easy removal of slide S1 from the device.

Also in FIG. 3, slide S2 is shown in the fully inserted position which merely requires that more force in the downward direction be applied to the slide S2 when inserted for the first time into the holder or an additional force to the slide after it has been partially inserted. In the fully inserted position, there is greater deformation of portions 19 and 18 along with a greater deformation of portion 12 in the downward direction. Since the spacing between adjacent strips 10 is set to be less than the length of a slide, edge 17 still coacts with the top portion T2 of slide S2 when the fully inserted position so as to make the removal thereof relatively easy. However, due to the resilient nature of the material of the holding strip 10, the slide S2 is firmly held in place and resists movement in the lateral direction of the inadvertent spilling from the device.

The use of such a device, as shown in FIG. 4, enables one to program or edit sequences for a multi media program. If for example, four projections are used, the board can be used to program up to 20 sequences for the embodiment shown therein by the arrangement of the slides thereon. The easy removal and insertion of the board makes the programming and editing tasks simpler and the firm retention of the slides in the board makes the inadvertent destruction of the program much less likely. It can easily be seen that either the sliding of a slide in the lateral position or the falling out of the slide from the device would adversely effect the programming sequence that had been obtained.

In a preferred embodiment, the strips 10 are extruded vinyl rubber, preferably Kreton TM. The elements are preferably spaced approximately 1.86 inches apart and are mounted on preferably a clear acrylic plastic, i.e. Plexiglass TM having a thickness of preferably ⅛ inch. It has been found to be particularly advantageous to adhere the Kreton TM strips to a Plexiglass TM board using a cyanoacrylic adhesive and further, it has been found to be advantageous to wipe a silicone liquid along the pressure edge at portion 18 to reduce friction.

In use, to place a slide in the device, one simply holds a slide at the top and inserts it into the slot 14, pressing it down lightly. The slide then rests against portion 18 and the face of the planar member 1 at the bottom and along edge 17 at the top so that it may be easily picked or retrieved.

When sorting and editing a program, the slides can be lightly inserted into their channels so that they can be easily removed or repositioned. Once the program sequence has been established, the slides can be firmly pressed into place in the fully inserted position so that it cannot move laterally or be spilled.

It should be appreciated, that the shape of the profile of the holding strips can be modified and that minor dimension changes can be made without departing from the scope of the invention.

What is claimed is:

1. A holding device for the sorting or editing of slides and the like comprising:
    a transparent rigid planar backing member; and
    means mounted on one face of the planar backing member for holding slides on the backing member in at least one row comprising at least two slide holding strips spaced apart by a distance not greater than the length of the slides to be held and each strip comprising resilient flexible material having a first portion coactive with the one face of the backing member to form an expandable slot receptive of the bottom edge of a slide therebetween in a partially inserted position in response to a first substantially downward force to retain the slide for easy removal and in a fully inserted position in resonse to a second substantially downward force greater than the first force to retain the slide to prevent lateral movement and inadvertent removal thereof and a second portion for engaging the top portion of the slide when the slide is in the partially or fully inserted position to maintain the top edge in a spaced apart relationship with respect to the one surface of the backing member.

2. The device according to claim 1 wherein the first portion comprises a substantially inverted U-shaped cross-section and a shoulder portion disposed therebelow and wherein the second portion comprises an arcuate cross-section having one end thereof engaging with the top edge portion of the inserted slides.

3. The device according to claim 1 wherein the slide holding strips each comprise a vinyl rubber.

4. The device according to claim 1 comprising a plurality of parallel slide holding strips with one row defined between each adjacent two strips.

5. The device according to claim 1 wherein the planar member further comprises means forming a handle at the top portion thereof comprising an aperture therein.

6. The device according to claim 1 further comprising means for reducing the friction upon insertion of the slide comprising silicon liquid disposed along the edge of each strip facing the one face of the planar backing member.

7. The device according to claim 1 wherein the planar backing member further comprises a planar extension thereof below the bottommost row for mounting the planar backing member in an upright position.

8. The device according to claim 1 or 2, wherein the first portion is normally spaced apart from the one surface of the backing member.

* * * * *